(12) United States Patent
Wang et al.

(10) Patent No.: US 11,983,535 B2
(45) Date of Patent: May 14, 2024

(54) ARTIFICIAL INTELLIGENCE COMPUTING DEVICE AND RELATED PRODUCT

(71) Applicant: Cambricon Technologies Corporation Limited, Beijing (CN)

(72) Inventors: Nan Wang, Beijing (CN); Xiaobing Chen, Beijing (CN); Yongzhe Sun, Beijing (CN); Yongwei Zhao, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 17/440,529

(22) PCT Filed: Mar. 20, 2020

(86) PCT No.: PCT/CN2020/080447
§ 371 (c)(1),
(2) Date: Sep. 17, 2021

(87) PCT Pub. No.: WO2020/192587
PCT Pub. Date: Oct. 1, 2020

(65) Prior Publication Data
US 2022/0156077 A1    May 19, 2022

(30) Foreign Application Priority Data

Mar. 22, 2019   (CN) .......................... 201910226552.7
Mar. 22, 2019   (CN) .......................... 201910226678.4
Apr. 18, 2019   (CN) .......................... 201910316537.1

(51) Int. Cl.
*G06F 9/32*   (2018.01)
*G06F 9/30*   (2018.01)
*G06N 3/063*  (2023.01)

(52) U.S. Cl.
CPC .......... *G06F 9/325* (2013.01); *G06F 9/30032* (2013.01); *G06F 9/30145* (2013.01); *G06N 3/063* (2013.01)

(58) Field of Classification Search
CPC .. G06F 9/325; G06F 9/30032; G06F 9/30145; G06N 3/063
See application file for complete search history.

(56) References Cited

U.S. PATENT DOCUMENTS 6,282,633 B1    8/2001 Killian
9,443,192 B1 *  9/2016 Cosic ................. G06N 5/048
(Continued)

FOREIGN PATENT DOCUMENTS

CN   1133452 A     10/1996
CN   103957463 A   7/2014
(Continued)

OTHER PUBLICATIONS

PCT/CN2020/080447—International Search Report, dated Jun. 19, 2020, 4 pages.
(Continued)

*Primary Examiner* — Zachary K Huson
(74) *Attorney, Agent, or Firm* — Getech Law LLC; Jun Ye

(57) ABSTRACT

The invention provides an artificial intelligence computing device and a related product. The artificial intelligence computing device is used for executing machine learning computation. According to the device of the invention, for the instructions in the more than two instruction sets forming the loop body, the same operation code in the operation code storage area is used for the repeated instructions, so that the storage space of the operation code is saved, the code amount of each instruction in the instruction set in the second time slice can be reduced, the instruction storage
(Continued)

obtaining a first instruction set to be executed, and obtaining a second instruction set  — 201 determining whether a loop body is formed between the first instruction set and the second instruction set  — 202 executing instructions of the second instruction set according to instruction information of the first instruction set when a loop body is formed between the first instruction set and the second instruction set  — 203 space can also be saved, and the operation efficiency is improved.

20 Claims, 4 Drawing Sheets

(56) References Cited

U.S. PATENT DOCUMENTS

| | | | |
|---|---|---|---|
| 2006/0247818 A1 | 11/2006 | Hasan | |
| 2008/0141012 A1* | 6/2008 | Yehia | G06F 9/30032 712/226 |
| 2008/0162399 A1* | 7/2008 | Tam | G06N 5/025 706/59 |
| 2012/0079303 A1 | 3/2012 | Madduri | |
| 2012/0151463 A1* | 6/2012 | Kalogeropulos | G06F 8/452 717/160 |

FOREIGN PATENT DOCUMENTS

| | | | |
|---|---|---|---|
| CN | 104866341 | A | 8/2015 |
| CN | 107992329 | A | 5/2018 |
| CN | 108734288 | A | 11/2018 |
| CN | 108764487 | A | 11/2018 |
| CN | 108897587 | A | 11/2018 |
| CN | 109255234 | A | 1/2019 |
| CN | 109634843 | A | 4/2019 |
| WO | 9919795 | A1 | 4/1999 |

OTHER PUBLICATIONS

CN 201910316537.1—First Office Action, dated Apr. 15, 2020, 9 pages. (With Brief English Explanation).
CN 201910316537.1—Office Action, dated Feb. 23, 2021, 7 pages. (With Brief English Explanation).
CN 201910316537.1—Office Action, dated Sep. 27, 2020, 6 pages. (With Brief English Explanation).
CN201910226552.7—First Office Action dated May 11, 2023, 8 pages. (With Brief English Explanation).
CN201910226678.4—First Office Action dated Nov. 8, 2023, 16 pages.

* cited by examiner

ARTIFICIAL INTELLIGENCE COMPUTING DEVICE AND RELATED PRODUCT

CROSS REFERENCE TO RELATED APPLICATIONS

This application is a 371 of International Application No. PCT/CN2020/080447, filed Mar. 20, 2020, which claims priority to foreign applications, Chinese Application No. 201910226552.7, filed Mar. 22, 2019, Chinese Application No. 201910226678.4, filed Mar. 22, 2019, and Chinese Application No. 201910316537.1, filed Apr. 18, 2019. The contents of each of the above-captioned patent applications are hereby expressly incorporated herein by reference in their entireties.

TECHNICAL FIELD

The disclosure relates generally to the field of information processing technologies, and more specifically to an artificial intelligence computing device and a related product.

BACKGROUND

The artificial neural network is a powerful algorithm, which has been applied in various fields such as image and language in recent years. An artificial intelligence computing device can enable the neural network to be supported by hardware and perform computations more efficiently. The artificial intelligence computing device generally has its own instruction set which contains many instructions to be executed. It takes a long time to execute all the instructions in the instruction set, which will affect the efficiency; in addition, some instructions will be repeatedly executed. For example, in the process of data loading, if the data size is large, multiple moves are required to complete address space conversion; for another example, repeated addition and multiplication operations will occur in a template operation, where the counted repeated operations are performed directly in normal operations, each instruction corresponds to a piece of execution code, and the codes corresponding to the repeated instructions occupy a large storage space.

SUMMARY

The embodiments of the present disclosure provide an artificial intelligence computing device and a related product, which can reduce the code amount of instruction information of instructions and improve the efficiency of instruction computation.

A first aspect of the present disclosure provides an artificial intelligence computing device including a controller unit and an execution unit, where the controller unit is configured to obtain a first instruction set to be executed, and obtain a second instruction set;

the controller unit is further configured to determine whether a loop body is formed between the first instruction set and the second instruction set; and the execution unit is configured to execute instructions in the second instruction set according to instruction information of the first instruction set when a loop body is formed between the first instruction set and the second instruction set.

A second aspect of the present disclosure provides an artificial intelligence computing method applied to the artificial intelligence computing device, and the artificial intelligence computing method includes:

obtaining a first instruction set to be executed, and obtaining a second instruction set;

determining whether a loop body is formed between the first instruction set and the second instruction set; and executing instructions in the second instruction set according to instruction information of the first instruction set when a loop body is formed between the first instruction set and the second instruction set.

A third aspect of the present disclosure provides a machine learning operating device, which includes one or more artificial intelligence computing devices described in the first aspect. The machine learning operating device is configured to obtain data to be computed and control information from other processing devices, execute a specified machine learning operation, and transfer an execution result to a peripheral device through an I/O interface. When the machine learning operating device includes a plurality of artificial intelligence computing devices, the plurality of artificial intelligence computing devices can be interconnected and transfer data to each other through a specific structure. The plurality of artificial intelligence computing devices may be interconnected through a Peripheral Component Interconnect Express (PCIE) bus and transfer data to support larger-scale machine learning operations; the plurality of artificial intelligence computing devices share a same control system or have their own control systems; the plurality of artificial intelligence computing devices share a same memory or have their own memories; and an interconnection manner of the plurality of artificial intelligence computing devices is arbitrary interconnection topology.

A fourth aspect of the present disclosure provides a combined processing device including the machine learning operating device provided in the third aspect, a universal interconnect interface, and other processing devices. The machine learning operating device interacts with other processing devices to perform user-specified operations. The combined processing device may further include a storage device connected to the machine learning operating device and other processing devices, respectively, for storing data of the machine learning operating device and other processing devices.

A fifth aspect of the present disclosure provides a neural network chip, which includes the computing device provided in the first aspect, the machine learning operating device provided in the third aspect, or the combined processing device provided in the fourth aspect.

A sixth aspect of the present disclosure provides a neural network chip package structure including the neural network chip provided in the fifth aspect.

A seventh aspect of the present disclosure provides a board card including the neural network chip package structure provided in the sixth aspect.

An eighth aspect of the present disclosure provides a computer-readable storage medium that stores a computer program for exchanging electronic data, where the computer program enables a computer to execute the method described in the second aspect.

A ninth aspect of the present disclosure provides a computer program product, which includes a non-transitory computer-readable storage medium storing a computer program, where the computer program enables a computer to execute the method described in the second aspect.

A tenth aspect of the present disclosure provides an electronic device including the neural network chip provided in the fifth aspect or the board card provided in the seventh aspect.

In some embodiments, the electronic devices may include data processing devices, robots, computers, printers, scanners, tablets, smart terminals, mobile phones, driving recorders, navigators, sensors, cameras, servers, cloud servers, cameras, cameras, projectors, watches, headphones, mobile storage, wearable devices, vehicles, household appliances, and/or medical devices.

In some embodiments, the vehicles may include an aircraft, a ship, and/or a car; the household appliance may include a television, an air conditioner, a microwave oven, a refrigerator, a rice cooker, a humidifier, a washing machine, an electric lamp, a gas stove, a range hood; the medical device may include a nuclear magnetic resonance instrument, a B-ultrasound, and/or an electrocardiograph.

In the embodiments of the present disclosure, through a controller unit, the artificial intelligence computing device obtains a first instruction set to be executed and a second instruction set, and determines whether a loop body is formed between the first instruction set and the second instruction set; through an execution unit, the artificial intelligence computing device executes instructions in the second instruction set according to instruction information of the first instruction set when a loop body is formed between the first instruction set and the second instruction set. Therefore, the code amount of instruction information of instructions can be reduced and the efficiency of instruction computation can be improved.

BRIEF DESCRIPTION OF THE DRAWINGS

In order to explain the embodiments of the present disclosure or the technical solutions in the prior art more clearly, accompanied drawings used in the descriptions of the embodiments or the prior art will be briefly introduced below. Obviously, the accompanied drawings in the following descriptions are merely some embodiments of the present disclosure. For those of ordinary skill in the art, other drawings can be obtained based on these accompanied drawings without creative efforts.

DETAILED DESCRIPTIONS

Technical solutions in the embodiments of the present disclosure may be described clearly and completely hereinafter with reference to the accompanied drawings in the embodiments of the present disclosure. Apparently, the described embodiments are merely some rather than all embodiments of the present disclosure. All other embodiments obtained by those skilled in the art based on the embodiments of the present disclosure without creative efforts shall fall within the protection scope of the present disclosure.

It should be understood that the terms such as "first", "second", "third", "fourth", and the like used in the specification, the claims, and the accompanied drawings of the present disclosure are used for distinguishing between different objects rather than describing a particular order. In addition, the terms "include" and "comprise" and any variations are intended to cover non-exclusive inclusion. For example, processes, methods, systems, products or equipment of a series of steps or units are not limited to the listed steps or units, but optionally also includes unlisted steps or units, or optionally, other steps or units inherent to these processes, methods, products or equipment are included.

The "embodiment" mentioned in the present disclosure refers to that a specific feature, structure, or characteristic described in conjunction with the embodiment may be included in at least one embodiment of the present disclosure. The appearance of "embodiment" in various places in the specification does not necessarily refer to the same embodiment, nor is it an independent or alternative embodiment mutually exclusive with other embodiments. Those skilled in the art clearly and implicitly understand that the embodiments described in the present disclosure can be combined with other embodiments.

Figure 1:
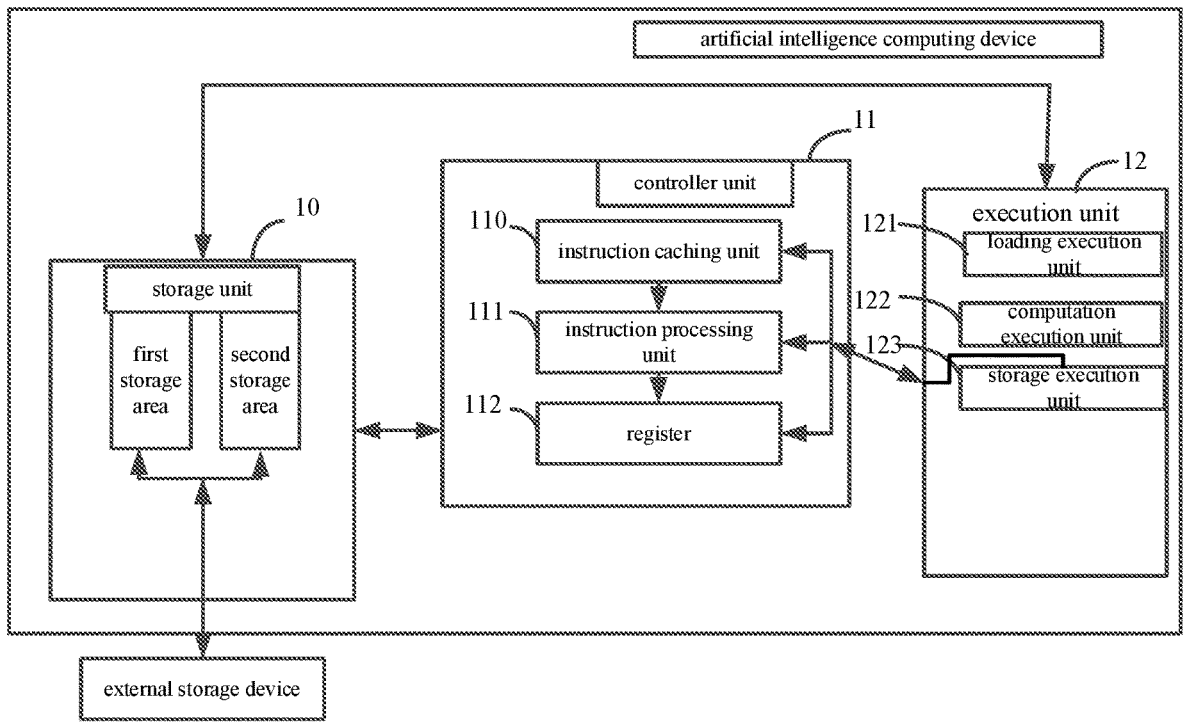
FIG. 1 is a schematic structural diagram of an artificial intelligence computing device according to an embodiment of the present disclosure.

The computing device used in the present disclosure is introduced first. FIG. 1 is a schematic structural diagram of an artificial intelligence computing device according to an embodiment of the present disclosure. The artificial intelligence computing device is configured to perform machine learning computations, and includes a controller unit 11, a storage unit 10, and an execution unit 12. The storage unit 10 is connected to an external storage device. The execution unit 12 includes a loading execution unit 121, a computation execution unit 122, and a storage execution unit 123. The controller unit is configured to obtain a first instruction set to be executed, and obtain a second instruction set; the controller unit is further configured to determine whether a loop body is formed between the first instruction set and the second instruction set; and the execution unit is configured to execute instructions in the second instruction set according to instruction information of the first instruction set when a loop body is formed between the first instruction set and the second instruction set.

In some embodiments, for executing instructions in the second instruction set according to instruction information of the first instruction set, the execution unit is specifically configured to:

jump to an operation code storage area of a first instruction in the first instruction set corresponding to a second instruction in the second instruction set according to a jump instruction, obtain an operation code of the first instruction from the operation code storage area, and take the operation code as an operation code of the second instruction, where the operation code includes an identification of the first instruction.

In some embodiments, the first instruction set includes a first loading instruction, a first computing instruction, and a first storage instruction of a first operation task; the second instruction set includes a second loading instruction, a second computing instruction, and a second storage instruction of a second operation task. For determining whether a loop body is formed between the first instruction set and the second instruction set, the controller unit is specifically configured to:

obtain preset instruction information corresponding to each instruction in the first instruction set and the second instruction set to obtain a plurality of pieces of preset instruction information, where the preset instruction information includes at least one of: instruction type, remaining execution times, and whether the parity is reversed;

compare first preset instruction information corresponding to the first loading instruction with second preset instruction information corresponding to the second loading instruction; compare third preset instruction information corresponding to the first computing instruction with fourth preset instruction information corresponding to the second computing instruction; and compare fifth preset instruction information corresponding to the first storage instruction with sixth preset instruction information corresponding to the second storage instruction; and if there is only a difference in operation times between the first preset instruction information and the second preset instruction information, there is only a difference in operation times between the third preset instruction information and the fourth preset instruction information, and there is only a difference in operation times between the fifth preset instruction information and the sixth preset instruction information, determine that the first instruction set and the second instruction set form a loop body.

In some embodiments, the first instruction set includes the first storage instruction of the first operation task, the second computing instruction of the second operation task, and a third loading instruction corresponding to a third operation task; the second instruction set includes the second storage instruction of the second operation task, a third computing instruction of the third operation task, and a fourth loading instruction of a fourth operation task. For determining whether a loop body is formed between the first instruction set and the second instruction set, the controller unit is specifically configured to:

obtain preset instruction information corresponding to each piece of instruction in the first instruction set and the second instruction set to obtain a plurality of pieces of preset instruction information, where the preset instruction information includes at least one of: instruction type, remaining execution times, and whether the parity is reversed;

compare fifth preset instruction information corresponding to the first storage instruction with sixth preset instruction information corresponding to the second storage instruction; compare seventh preset instruction information corresponding to the second computing instruction with eighth preset instruction information corresponding to the third computing instruction; compare ninth preset instruction information corresponding to the third loading instruction with tenth preset instruction information corresponding to the fourth loading instruction; and if there is only a difference in operation times between the fifth preset instruction information and the sixth preset instruction information, there is only a difference in operation times between the seventh preset instruction information and the eighth preset instruction information, and there is only a difference in operation times between the ninth preset instruction information and the tenth preset instruction information, determine that the first instruction set and the second instruction set form a loop body.

In some embodiments, the controller unit is further configured to:

determine whether there is correlation between the first storage instruction, the second computing instruction, and the third loading instruction.

The execution unit is further configured to, when there is no correlation between the first storage instruction, the second computing instruction, and the third loading instruction, execute the first storage instruction, the second computing instruction, and the third loading instruction in parallel in a first time slice.

In some embodiments, for determining whether there is correlation between the first storage instruction, the second computing instruction, and the third loading instruction, the controller unit is specifically configured to:

fetch a first storage address interval of required data in the first storage instruction, fetch a second storage address interval of required data in the second computing instruction, and fetch a third storage address interval of required data in the third loading instruction; and if the first storage address interval, the second storage address interval, and the third storage address interval do not have overlapping areas between each other, determine that there is no correlation between the first storage instruction, the second computing instruction, and the third loading instruction.

In some embodiments, for determining whether there is correlation between the first storage instruction, the second computing instruction, and the third loading instruction, the controller unit is specifically configured to:

fetch a first writing area corresponding to the first storage instruction, fetch a second reading area and a second writing area corresponding to the second computing instruction, and fetch a third reading area corresponding to the third loading instruction; and if the first writing area, the second reading area, the second writing area, and the third reading area do not have overlapping areas between each other, determine that there is no correlation between the first storage instruction, the second computing instruction, and the third loading instruction.

In some embodiments, the artificial intelligence computing device also includes a storage unit connected to an external storage device; the execution unit includes a loading execution unit, a computation execution unit, and a storage execution unit.

For executing the first storage instruction, the second computing instruction, and the third loading instruction in parallel in the first time slice, the storage execution unit is configured to transfer a first computation result corresponding to first input data in the first operation task from the storage unit to the external storage device according to the first storage instruction; the computation execution unit is configured to compute second input data in the second operation task according to the second computing instruction to obtain a second computation result; and the loading execution unit is configured to transfer third input data in the third operation task from the external storage device to the storage unit according to the third loading instruction.

In some embodiments, the storage unit includes a first storage area and a second storage area. For transferring the third input data in the third operation task from the external storage device to the storage unit according to the third loading instruction, the loading execution unit is specifically configured to:

perform a ping-pong operation on the third input data in the third operation task in the first time slice according to the third loading instruction, and transfer the third input data from the external storage device to the first storage area.

In some embodiments, the third input data includes a plurality of pieces of third input sub-data. For performing the ping-pong operation on the third input data in the third operation task and transferring the third input data from the external storage device to the first storage area, the loading execution unit is specifically configured to:

predict a target storage duration of each piece of third input sub-data in the first storage area among the plurality of pieces of third input sub-data to obtain a plurality of target storage durations; and transfer the plurality of pieces of third input sub-data corresponding to the plurality of target storage durations to the first storage area in order of storage duration from the longest to the shortest, and store the plurality of third input sub-data from both ends of the first storage area to the middle.

Figure 2A:
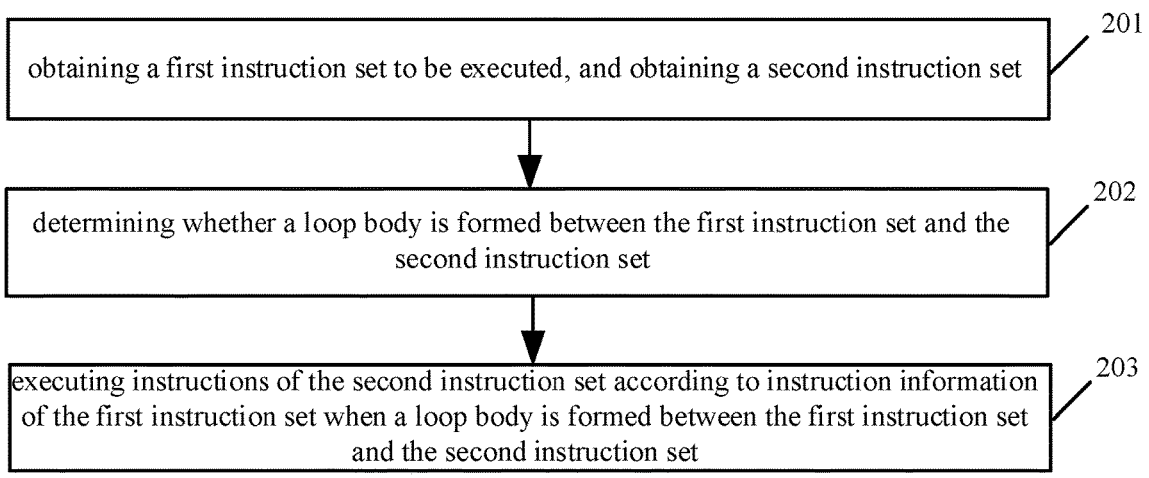
FIG. 2A is a flowchart of an artificial intelligence computing method according to an embodiment of the present disclosure.

FIG. 2A is a flowchart of an artificial intelligence computing method according to an embodiment of the present disclosure, where the artificial intelligence computing method is applied to an artificial intelligence computing device. The artificial intelligence computing device includes a controller unit, a storage unit, and an execution unit; the storage unit is connected to an external storage device, and the execution unit includes a loading execution unit, a computation execution unit, and a storage execution unit. The artificial intelligence computing method includes:

step 201: obtaining a first instruction set to be executed, and obtaining a second instruction set.

In the embodiments of the present disclosure, a plurality of instructions in an instruction set of the neural network can be divided into input and output instructions and computing instructions, where the input and output instructions can be divided into loading instructions and storage instructions. The execution unit of the artificial intelligence computing device is configured to transfer input data from the external storage device to the storage unit in the artificial intelligence computing device according to the loading instruction, directly obtain the input data from the storage unit according to the computing instruction, compute the input data to obtain a computation result, store the computation result to the storage unit, and finally transfer the computation result from the storage unit to the external storage device according to the storage instruction.

In some embodiments, instructions in the instruction set of the neural network can be divided by the stage of loading, computing, and storage, or by other standards, which is not limited in the embodiments of the present disclosure.

Optionally, a first instruction set may include a first loading instruction, a first computing instruction and a first storage instruction of a first operation task; a second instruction set may include a second loading instruction, a second computing instruction and a second storage instruction of a second operation task. The first loading instruction is configured to transfer first input data in the first operation task from the external storage device to the storage unit; the first computing instruction is configured to compute the first input data in the first operation task to obtain a first computation result; and the first storage instruction is configured to transfer the first computation result from the storage unit to the external storage device. The second loading instruction is configured to transfer second input data in the second operation task from the external storage device to the storage unit; the second computing instruction is configured to compute the second input data in the second operation task to obtain a second computation result; and the second storage instruction is configured to transfer the second computation result from the storage unit to the external storage device.

Optionally, the first instruction set may include the first storage instruction of the first operation task, the second computing instruction of the second operation task, and the third loading instruction of the third operation task; the second instruction set may include the second storage instruction of the second operation task, the third computing instruction of the third operation task, and the fourth loading instruction of the fourth operation task. The first storage instruction is configured to transfer the first computation result from the storage unit to the external storage device; the second computing instruction is configured to compute the second input data in the second computation task to obtain the second computation result; and the third loading instruction is configured to transfer the third input data in the third operation task from the external storage device to the storage unit. The second storage instruction is configured to transfer the second computation result from the storage unit to the external storage device; the third computing instruction is configured to compute the third input data in the third computation task to obtain the third computation result; and the fourth loading instruction is configured to transfer the fourth input data in the fourth operation task from the external storage device to the storage unit.

The artificial intelligence computing method further includes:

step 202: determining whether a loop body is formed between the first instruction set and the second instruction set.

Optionally, the first instruction set includes a first loading instruction, a first computing instruction, and a first storage instruction of the first operation task; the second instruction set includes a second loading instruction, a second computing instruction, and a second storage instruction of the second operation task. In the step 202, the determining whether a loop body is formed between the first instruction set and the second instruction set includes following steps:

obtaining preset instruction information corresponding to each instruction in the first instruction set and the second instruction set to obtain a plurality of pieces of preset instruction information, where the preset instruction information includes at least one of: instruction type, remaining execution times, and whether the parity is reversed;

comparing first preset instruction information corresponding to the first loading instruction with second preset instruction information corresponding to the second loading instruction; compare third preset instruction information corresponding to the first computing instruction with fourth preset instruction information corresponding to the second computing instruction; and compare fifth preset instruction information corresponding to the first storage instruction with sixth preset instruction information corresponding to the second storage instruction; and if there is only a difference in the number of operations between the first preset instruction information and the second preset instruction information, there is only a difference in the number of operations between the third preset instruction information and the fourth preset instruction information, and there is only a difference in the number of operations between the fifth preset instruction information and the sixth preset instruction information, determining that the first instruction set and the second instruction set form a loop body.

In some embodiments, the preset instruction information includes at least one of: instruction type, remaining execution times, and whether the parity is reversed. The instruction type refers to whether an instruction is a loading instruction, a computing instruction, or a storage instruction, and when an instruction is a computing instruction, several operators are included in the computing instruction, where the operators may include at least one of the following: addition, subtraction, multiplication, division, convolution, and a combination of the above operators, etc. The remaining execution times refers to the remaining execution times of repeated operations that need to be executed a plurality of times in an operation.

In some embodiments, the first loading instruction, the first computing instruction, and the first storage instruction in the first computing task can be compared with the corresponding preset instruction information of the second loading instruction, the second computing instruction and the second storage instruction in the second computing task to determine whether the loop body between the first instruction set and the second instruction set is formed. For example, in an operation $Y_i=\Sigma(wx_i+b)$, when i=1, 2, 3, ... 100, it is assumed that $Y_1=wx_1+b$ is the first operation task, $Y_2=wx_2+b$ is the second operation task, the first loading instruction, the first computing instruction and the first storage instruction of the $Y_1=wx_1+b$ operation correspond to the first instruction set, and the second loading instruction, the second computing instruction, and the second storage instruction of the $Y_2=wx_2+b$ operation correspond to the second instruction set. Among a plurality of pieces of preset instruction information corresponding to $Y_1=wx_1+b$ operation, the remaining computation times of the first computing instruction corresponding to the $Y_1=wx_1+b$ operation are 99 times, and the remaining computation times of the second computing instruction corresponding to the $Y_2=wx_2+b$ operation are 98 times. In the instructions in the first instruction set corresponding to the first operation task and the instructions in the second instruction set corresponding to the second operation task, the first loading instruction and the second loading instruction are of the same type, while the remaining loading times are different; the first storage instruction and the second storage instruction are of the same type, while the remaining storage times are different; and the operators in the first computing instruction and the second computing instruction both include addition and multiplication, the order of operations is the same, except that the remaining computation times are different. Therefore, it is determined that a loop body is formed between the first instruction set and the second instruction set.

Optionally, the first instruction set includes the first storage instruction of the first operation task, the second computing instruction of the second operation task, and the third loading instruction of the third operation task; the second instruction set includes the second storage instruction of the second operation task, the third computing instruction of the third operation task, and the fourth loading instruction of the fourth operation task. In the above step 202, the determining whether a loop body is formed between the first instruction set and the second instruction set includes following steps:

obtaining preset instruction information corresponding to each instruction in the first instruction set and the second instruction set to obtain a plurality of pieces of preset instruction information, where the preset instruction information includes at least one of: instruction type, remaining execution times, and whether the parity is reversed;

comparing fifth preset instruction information corresponding to the first storage instruction with sixth preset instruction information corresponding to the second storage instruction; compare seventh preset instruction information corresponding to the second computing instruction with eighth preset instruction information corresponding to the third computing instruction; compare ninth preset instruction information corresponding to the third loading instruction with tenth preset instruction information corresponding to the fourth loading instruction; and if there is only a difference in the number of operations between the fifth preset instruction information and the sixth preset instruction information, there is only a difference in the number of operations between the seventh preset instruction information and the eighth preset instruction information, and there is only a difference in the number of operations between the ninth preset instruction information and the tenth preset instruction information, determine that the first instruction set and the second instruction set form a loop body.

Figure 2B:
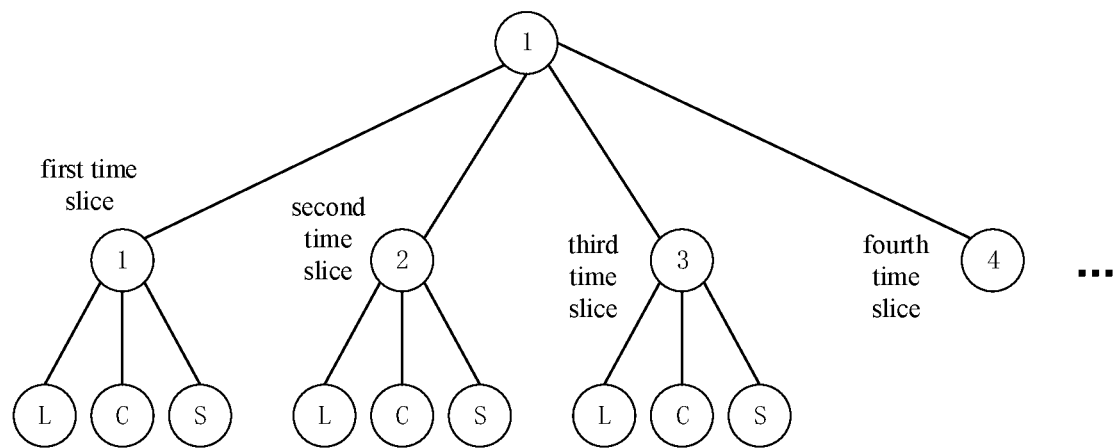
FIG. 2B is a schematic diagram illustrating a parallel execution method of instructions in a neural network instruction set according to an embodiment of the present disclosure.

In the embodiments of the present disclosure, as shown in FIG. 2B, the instructions in the instruction set of the neural network can be arranged in a tree structure. FIG. 2B is a schematic diagram illustrating a parallel execution method of instructions in a neural network instruction set according to an embodiment of the present disclosure. As shown in FIG. 2B, in the tree structure, numbers of a first layer are used to represent chip information, for example, "1" represents a first chip; numbers of a second layer are used to represent time slices, for example, "1" represents a first time slice, and "2" represents a second time slice, by analogy, letters of a third layer represent the loading instruction, computing instruction, and storage instruction in each time slice. In the tree structure, L represents a loading instruction, C represents a computing instruction, and S represents a storage instruction, each instruction corresponds to a piece of preset instruction information. For example, in the operation $Y_i=\Sigma(wx_i+b)$, when i=1, 2, 3, ... 100, the value of i changes from 1 to 100, then the total execution times of $Y_i=wx_i+b$ is 100, and in the first time slice, the total execution times of $Y_i=wx_i+b$ is 100, where addition and multiplication operations must be performed each time, so it can be determined that the 100 operations of Yi=wxi+b in this operation form a loop body.

In some embodiments, the loop body corresponding to the instruction set of each time slice can be parsed in advance to obtain the preset instruction information of each node in the tree structure, and for the adjacent first time slice and second time slice, it can be determined whether the first instruction set corresponding to the first time slice and the second instruction set corresponding to the second time slice form a loop body. Specifically, the fifth preset instruction information corresponding to the first storage instruction of the first operation task is compared with the sixth preset instruction information corresponding to the second storage instruction of the second operation task, the seventh preset instruction information corresponding to the second computing instruction of the second operation task is compared with the eighth preset instruction information corresponding to the third computing instruction of the third operation task, and the ninth preset instruction information corresponding to the third loading instruction of the third operation task is compared with the tenth preset instruction information corresponding to the fourth loading instruction of the fourth operation task. If the remaining execution times are different and the remaining execution times of the instruction corresponding to the second time slice are less, while the remaining information is exactly the same, it can be determined that the second instruction set corresponding to the second time slice and the first instruction set corresponding to the first time slice form a loop body. For example, if the first time slice contains a loading instruction, a computing instruction, and a storage instruction, the operators included in the computing instruction are addition and multiplication, the remaining operation times of the loading instruction are 5, the remaining operation times of the computing instruction are 9, and the remaining operation times of the storage instruction are 3; and if the second instruction set in the second time slice also contains a loading instruction, a computing instruction, and a storage instruction, the operators included in the computing instruction are addition and multiplication, the remaining operation times of the loading instruction are 4, the remaining operation times of the computing instruction are 8, and the remaining operation times of the storage instruction are 2, then it can be determined that the first instruction set corresponding to the first time slice and the second instruction set corresponding to the second time slice to which the computing instruction belongs form a loop body.

Furthermore, it can be determined whether a plurality of instruction sets corresponding to a plurality of consecutive time slices form a loop body, and if a plurality of instruction sets corresponding to a plurality of consecutive time slices form a loop body, the instructions of the same type in the consecutive time slices are repeated instructions. In the loop body, a starting point of the loop body is the time slice where the node with the largest number of remaining operations is located, and the length of the loop body is the difference between a farthest time slice that satisfies the loop condition and a starting time slice.

The artificial intelligence computing method further includes:

step 203: executing instructions in the second instruction set according to instruction information of the first instruction set when a loop body is formed between the first instruction set and the second instruction set.

In some embodiments, the instruction information may include an operation code and operation field of the instruction. In specific implementation, if a loop body is formed between the first instruction set and the second instruction set, the operation code and operation field of the instruction in the first instruction set can be stored, and when the instruction in the second instruction set is executed, the execution unit is jumped to the operation code of the instruction in the first instruction set that corresponds to the instruction in the second instruction set, then the instruction in the second instruction set is executed according to the operation code of the instruction in the first instruction set.

For example, in the operation $Y_i=\Sigma(wx_i+b)$, i=1, 2, 3, ... 100, the value of i changes from 1 to 100, then the total execution times of $Y_i=wx_i+b$ is 100. In the first time slice, the total execution times of $Y_i=wx_i+b$ is 100, where addition and multiplication operations must be performed each time, so it can be determined that the 100 operations of $Y_i=wx_i+b$ in this operation form a loop body. In the embodiments of the present disclosure, the operation code of the first computing instruction corresponding to the first time slice may be stored in an operation code storage area, and the operation code of a plurality of instructions corresponding to the $Y_i=wx_i+b$ operation does not need to be repeatedly stored 100 times. In the process of executing the second time slice, the execution unit may jump to the operation code storage area through a jump instruction obtain the operation code of the instruction in the first instruction set corresponding to the second instruction set, therefore, the operation code in the operation code storage area can be reused, the storage space of the operation code can be saved, the code amount of each instruction in the instruction set in the second time slice can be reduced, the instruction storage space can also be saved, and the operation efficiency can be improved.

Optionally, in the embodiments of the present disclosure, it is assumed that $Y_1=wx_1+b$ is the first operation task, $Y_2=wx_2+b$ is the second operation task, $Y_3=wx_3+b$ is the third operation task; the first instruction set includes the first storage instruction corresponding to the operation $Y_1=wx_1+b$, the first computing instruction corresponding to the operation $Y_2=wx_2+b$, and the first loading instruction corresponding to the operation $Y_3=wx_3+b$; and the second instruction set includes the second storage instruction corresponding to the operation $Y_2=wx_2+b$, the second computing instruction corresponding to the operation $Y_3=wx_3+b$, and the second loading instruction corresponding to an operation $Y_4=wx_4+b$. Among a plurality of pieces of preset instruction information corresponding to $Y_1=wx_1+b$ operation, the remaining computation times of the computing instruction corresponding to the $Y_1=wx_1+b$ operation are 99 times, and the remaining computation times of the first computing instruction corresponding to the $Y_2=wx_2+b$ operation are 98 times. Between the instructions in the first instruction set corresponding to the first time slice and the instructions in the second instruction set corresponding to the second time slice, the first loading instruction and the second loading instruction are of the same type, while the remaining loading times are different; the first storage instruction and the second storage instruction are of the same type, while the remaining storage times are different; and the operators in the first computing instruction and the second computing instruction both include addition and multiplication, the order of operations is the same, except that the remaining computation times are different. Therefore, it is determined that a loop body is formed between the first instruction set and the second instruction set.

Optionally, in the step 203, the executing instructions in the second instruction set according to the instruction information of the first instruction set may include following steps:

jumping to an operation code storage area of a first instruction in the first instruction set corresponding to a second instruction in the second instruction set according to a jump instruction, obtaining an operation code of the first instruction from the operation code storage area, and taking the operation code as an operation code of the second instruction, where the operation code includes an identification of the first instruction.

Optionally, in the embodiments of the present disclosure, the artificial intelligence computing method further includes following steps:

A1. determining whether there is correlation between the first storage instruction, the second computing instruction, and the third loading instruction; and A2. when there is no correlation between the first storage instruction, the second computing instruction, and the third loading instruction, executing the first storage instruction, the second computing instruction, and the third loading instruction in parallel in a first time slice.

In the embodiments of the present disclosure, parallel execution can be performed between a loading instruction and a storage instruction, between a loading instruction and a computing instruction, and between a storage instruction and a computing instruction; while parallel execution is not allowed between a loading instruction and another loading instruction, between a computing instruction and another computing instruction, and between a storage instruction and another storage instruction, but serial execution can be performed between a loading instruction and another loading instruction, between a computing instruction and another computing instruction, and between a storage instruction and another storage instruction.

Figure 2C:
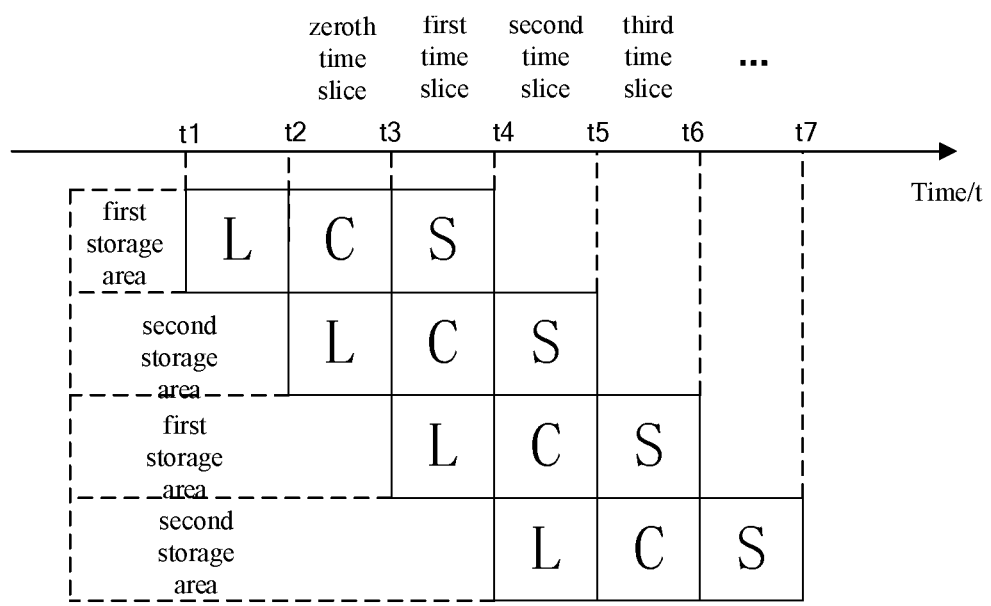
FIG. 2C is a schematic diagram illustrating a method of arranging instructions in an instruction set in a tree structure according to an embodiment of the present disclosure.

In some embodiments, in the process of executing instructions, between two instructions, if the execution of an instruction requires data of another instruction, it indicates that there is correlation between the two instructions. For example, if the execution of a computing instruction requires data of a loading instruction, it indicates that the computing instruction can be executed after the loading instruction has been executed, and it can be determined that the loading instruction has correlation with the computing instruction. Therefore, the correlation between the instructions to be executed can be determined. If it is determined that a plurality of instructions to be executed do not have correlation, two or three instructions that do not have correlation are executed in parallel through the loading execution unit, the computation execution unit, and the storage execution unit in the execution unit. In the embodiments of the present disclosure, the situations in which instructions can be executed in parallel include the following: a loading instruction and a storage instruction can be executed in parallel, a loading instruction and a computing instruction can be executed in parallel, a storage instruction and a computing instruction can be executed in parallel, a loading instruction, a computing instruction and a storage instruction can be executed in parallel. Therefore, in the embodiments of the present disclosure, as shown in FIG. 2C, a plurality of instructions in the instruction set of the neural network can be arranged in a pipeline manner. FIG. 2C is a schematic diagram illustrating arranging instructions in an instruction set in a tree structure according to an embodiment of the present disclosure. As shown in FIG. 2C, L represents a loading instruction, C represents a computing instruction, and S represents a storage instruction, where each horizontal row of loading instructions, computing instructions and storage instructions corresponds to an operation task, which can be performed to load input data, compute the input data to obtain a compute result, and store the result; a time slice corresponding to each vertical column of loading instructions, computing instructions, and storage instructions indicates that the loading instructions, computing instructions, and storage instructions that do not have correlation are executed in parallel. Therefore, by executing the instructions that do not have correlation in parallel, a plurality of operation tasks that do not have correlation can be executed in parallel, thereby saving computation time and improving computation efficiency.

Optionally, in the step A1, the determining whether there is correlation between the first storage instruction, the second computing instruction, and the third loading instruction may include following steps:

A11. fetching a first storage address interval of required data in the first storage instruction, fetching a second storage address interval of required data in the second computing instruction, and fetching a third storage address interval of required data in the third loading instruction; and A12. if the first storage address interval, the second storage address interval, and the third storage address interval do not have overlapping areas between each other, determining that there is no correlation between the first storage instruction, the second computing instruction, and the third loading instruction.

Optionally, in the step A1, the determining whether there is correlation between the first storage instruction, the second computing instruction, and the third loading instruction may include following steps:

A13. fetching a first writing area corresponding to the first storage instruction, fetching a second reading area and a second writing area corresponding to the second computing instruction, and fetching a third reading area corresponding to the third loading instruction; and A14. if the first writing area, the second reading area, the second writing area, and the third reading area do not have overlapping areas between each other, determining that there is no correlation between the first storage instruction, the second computing instruction, and the third loading instruction.

Optionally, the artificial intelligence computing device also includes a storage unit connected to an external storage device. In the step A2, the executing the first storage instruction, the second computing instruction, and the third loading instruction in parallel in a first time slice may include following steps:

B1. transferring a first computation result corresponding to first input data in the first operation task from the storage unit to the external storage device according to the first storage instruction;

B2. computing second input data in the second operation task according to the second computing instruction to obtain a second computation result; and B3. transferring third input data in the third operation task from the external storage device to the storage unit according to the third loading instruction.

Optionally, the storage unit includes a first storage area and a second storage area. In the step B3, the transferring third input data in the third operation task from the external storage device to the storage unit according to the third loading instruction may include following steps:

performing a ping-pong operation on the third input data in the third operation task in the first time slice according to the third loading instruction, and transferring the third input data from the external storage device to the first storage area.

In some embodiments, the storage unit can be divided into a first storage area and a second storage area. When a loading instruction in the instruction set of the neural network is executed, the ping-pong operation can be performed in turn to transfer the input data from the external storage device to the first storage area and the second storage area for storage. Specifically, in the first time slice, third input data can be stored in the first storage area according to a third loading instruction; and in the second time slice, fourth input data can be stored in the second storage area according to fourth loading instruction, at this time, the third computing instruction can be executed in parallel, and the third input data can be obtained from the first storage area according to the third computing instruction for computation to obtain a computation result; in a next time slice, the next piece of input data can be stored in the first storage area, and a next computing instruction corresponding to the fourth loading instruction can be executed in parallel, by analogy. Therefore, the storage space of the storage unit can be saved.

Optionally, the third input data includes a plurality of pieces of third input sub-data. The performing the ping-pong operation on the third input data in the third operation task and transferring the third input data from the external storage device to the first storage area may include following steps:

C1. predicting a target storage duration of each piece of third input sub-data in the first storage area among the plurality of pieces of third input sub-data to obtain a plurality of target storage durations; and C2. transferring the plurality of pieces of third input sub-data corresponding to the plurality of target storage durations to the first storage area in order of storage duration from the longest to the shortest, and storing the plurality of third input sub-data from both ends of the first storage area to the middle.

In some embodiments, the input data is stored in the first storage area, where the closer the storage location is to the middle, the longer it takes to read the input data during computation. Therefore, in the process of storing the plurality of pieces of third input sub-data, a target storage duration of each piece of third input sub-data is determined firstly, and then the third input sub-data is stored from both ends of the first storage area to the middle in order of storage duration from longest to shortest, therefore, in the process of obtaining the third input data for computation, the reading duration of the third input sub-data corresponding to a longer target storage duration can be reduced, and then the operation efficiency can be improved.

Similarly, in the process of transferring the input data from the external storage device to the second storage area, the input data may be stored from the two ends of the second storage area to the middle in order of storage duration from longest to shortest.

For example, in the process of performing an operation $Y_i=\Sigma(wx_i+b)$, w and b are data that will be read repeatedly, and the storage duration of w and b is longer, then w and b may be stored at both ends of the first storage area or the second storage area, and $x_i$ may be stored in the middle of the first storage area or the second storage area. In the process of reading data from the first storage area or the second storage area, the duration of reading of w and b is relatively short, so that the time consumption of reading data can be reduced.

For another example, as shown in FIG. 2C, each horizontal row of loading instructions, computing instructions, and storage instructions corresponds to an operation task. For example, the first operation task may include a first loading instruction La, a first computing instruction Ca, and a first storage instruction Sa. The input data may be loaded from the external storage device to an a1 area of the storage unit on the artificial intelligence computing device through the first loading instruction La; the input data is read from the a1 area through the first computing instruction Ca, and the input data is computed to obtain a computation result, and then the computation result is stored in an a2 area of the storage unit on the artificial intelligence computing device; finally, the computation result is read from the a2 area through the first storage instruction Sa, and the computation result is read from the a2 area of the storage unit to the external storage device. Similarly, the second operation task may include a second loading instruction Lb, a second computing instruction Cb, and a second storage instruction Sb; the third operation task may include a third loading instruction Lc, a third computing instruction Cc, and a third storage instruction Sc; and the fourth operation task may include a fourth loading instruction Ld, a fourth computing instruction Cd, and a fourth storage instruction Sd. In the first time slice, if there is no correlation between the first storage instruction Sa of the first operation task, the second computing instruction Cb of the second operation task, and the third loading instruction Lc of the third operation task, the first storage instruction Sa, the second computing instruction Cb, and the third loading instruction Lc can be executed in parallel in the first time slice. In addition, if the second operation task, the third operation task and the fourth operation task do not have correlation, the second storage instruction Sb of the second operation task, the third computing instruction Cc of the third operation task, and the fourth loading instruction Ld of the fourth operation task can be executed in parallel in the second time slice.

Furthermore, if the first instruction set composed of the first storage instruction Sa, the second computing instruction Cb, and the third loading instruction Lc executed in parallel in the first time slice forms a loop body with the second instruction set composed of the second storage instruction Sb, the third computing instruction Cc and the fourth loading instruction Ld executed in parallel in the second time slice, when executing the instruction in the instruction set corresponding to the second time slice, the execution unit may jump to the operation code storage area of the instruction corresponding to the first instruction set according to the jump instruction. Specifically, a first operation code of the third loading instruction Lc, a second operation code of the second computing instruction Cb, and a third operation code of the first storage instruction Sa are obtained from the operation code storage area; then, the first operation code is taken as the operation code of the fourth loading instruction Ld, the second operation code is taken as the operation code of the third computing instruction Cc, and the third operation code is taken as the operation code of the second storage instruction Sb; and a first operation field corresponding to the fourth loading instruction Ld, a second operation field corresponding to the third computing instruction Cc, and a third operation field corresponding to the second storage instruction Sb can be obtained.

According to the technical solution provided in the present disclosure, by folding the repeated instructions in the instruction set of the neural network and executing the repeated instructions through the jump instruction, the amount of unfolded code of the repeated instructions is reduced; and by storing the data in the neural network in different areas, the efficiency of obtaining data is improved, thereby increasing the operation efficiency of the neural network.

The present disclosure further provides a machine learning operating device, which includes one or more artificial intelligence computing devices provided in the present disclosure, and is configured to obtain data to be computed and control information from other processing devices, execute a specified machine learning operation, and transfer an execution result to a peripheral device through an I/O interface, where the peripheral device may include a camera, a display, a mouse, a keyboard, a network card, a wifi interface, server, etc. When the machine learning operating device includes a plurality of artificial intelligence computing devices, the plurality of artificial intelligence computing devices can be interconnected and transfer data to each other through a specific structure, for example, the plurality of artificial intelligence computing devices may be interconnected through a PCIE bus and transfer data to support larger-scale machine learning operations. The plurality of artificial intelligence computing devices share a same control system or have their own control systems; the plurality of artificial intelligence computing devices share a same memory or have their own memories; and an interconnection manner of the plurality of artificial intelligence computing devices is arbitrary interconnection topology. The machine learning operating device has high compatibility and can be connected to various types of servers through a PCIE interface.

Figure 3:
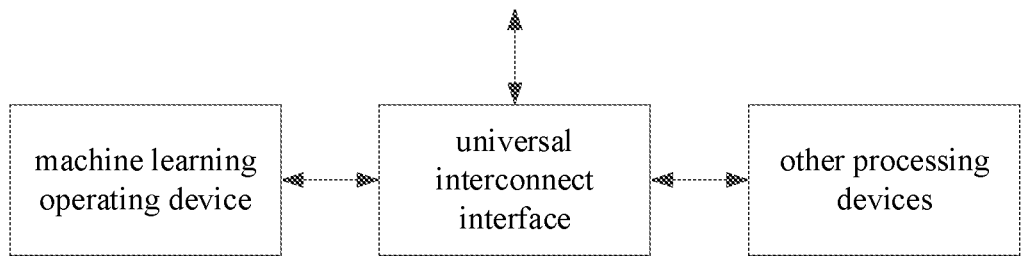
FIG. 3 is a schematic structural diagram of a combined processing device according to an embodiment of the present disclosure.

The present disclosure further provides a combined processing device including the machine learning operating device, a universal interconnect interface, and other processing devices. The machine learning operating device interacts with other processing devices to perform user-specified operations. FIG. 3 is a schematic structural diagram of a combined processing device according to an embodiment of the present disclosure.

The other processing devices may include one or more types of general-purpose/dedicated processor such as a CPU (Central Processing Unit), a GPU (Graphics Processing Unit), a neural network processor, and the like. The count of processors included in other processing devices is not limited. The other processing devices may serve as an interface between the machine learning operating device and external data, and complete basic control such as data moving, opening and stopping of the machine learning operating device; the other processing devices may also cooperate with the machine learning operating device to complete the operation task.

The universal interconnect interface may be configured to transfer data and control instruction between the machine learning operating device and other processing devices. The machine learning operating device may obtain the needed input data from other processing devices and write them into the on-chip storage unit of the machine learning operating device, obtain the control instruction from other processing devices and write them into an on-chip control cache of the machine learning operating device, and obtain the data in the storage modules of the machine learning operating device and then transmit them to other processing devices.

Figure 4:
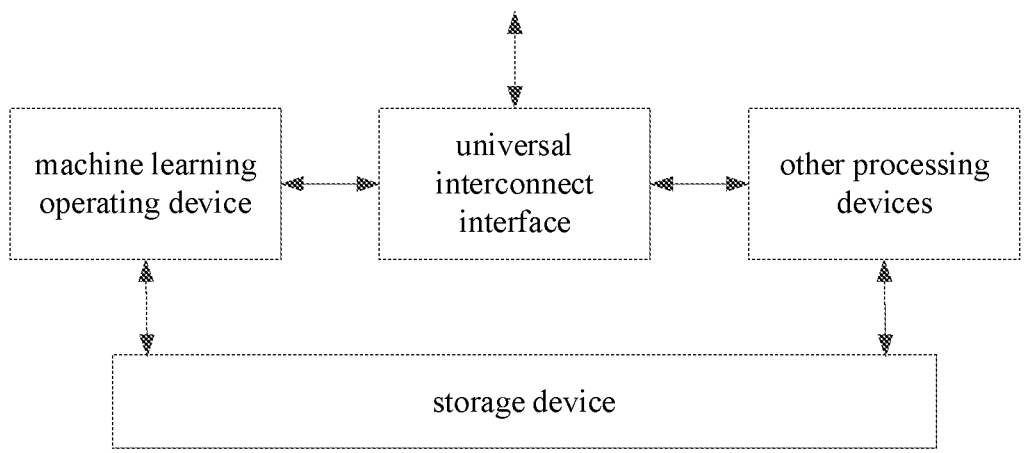
FIG. 4 is a schematic structural diagram of another combined processing device according to an embodiment of the present disclosure.

Optionally, as shown in FIG. 4, the combined processing device may further include a storage device, which may be respectively connected to the machine learning operating device and the other processing devices. The storage device may be configured to store data in the machine learning operating device and the other processing devices, and may be particularly suitable for storing the data which needs to be operated and cannot be stored completely in the internal storage part of the machine learning operating device or other processing devices.

The combined processing device may be served as an SOC on-chip system for mobile phones, robots, drones, video monitoring devices, etc., effectively reducing the core area of the control part, increasing the processing speed, and reducing the overall power consumption. In this case, the universal interconnect interface of the combined processing device is connected with some components of the device, such as a camera, a display, a mouse, a keyboard, a network card, and a wifi interface.

The present disclosure further provides a chip including the machine learning operating device or the combined processing device.

The present disclosure further provides a chip package structure, which may include the chip.

Figure 5:
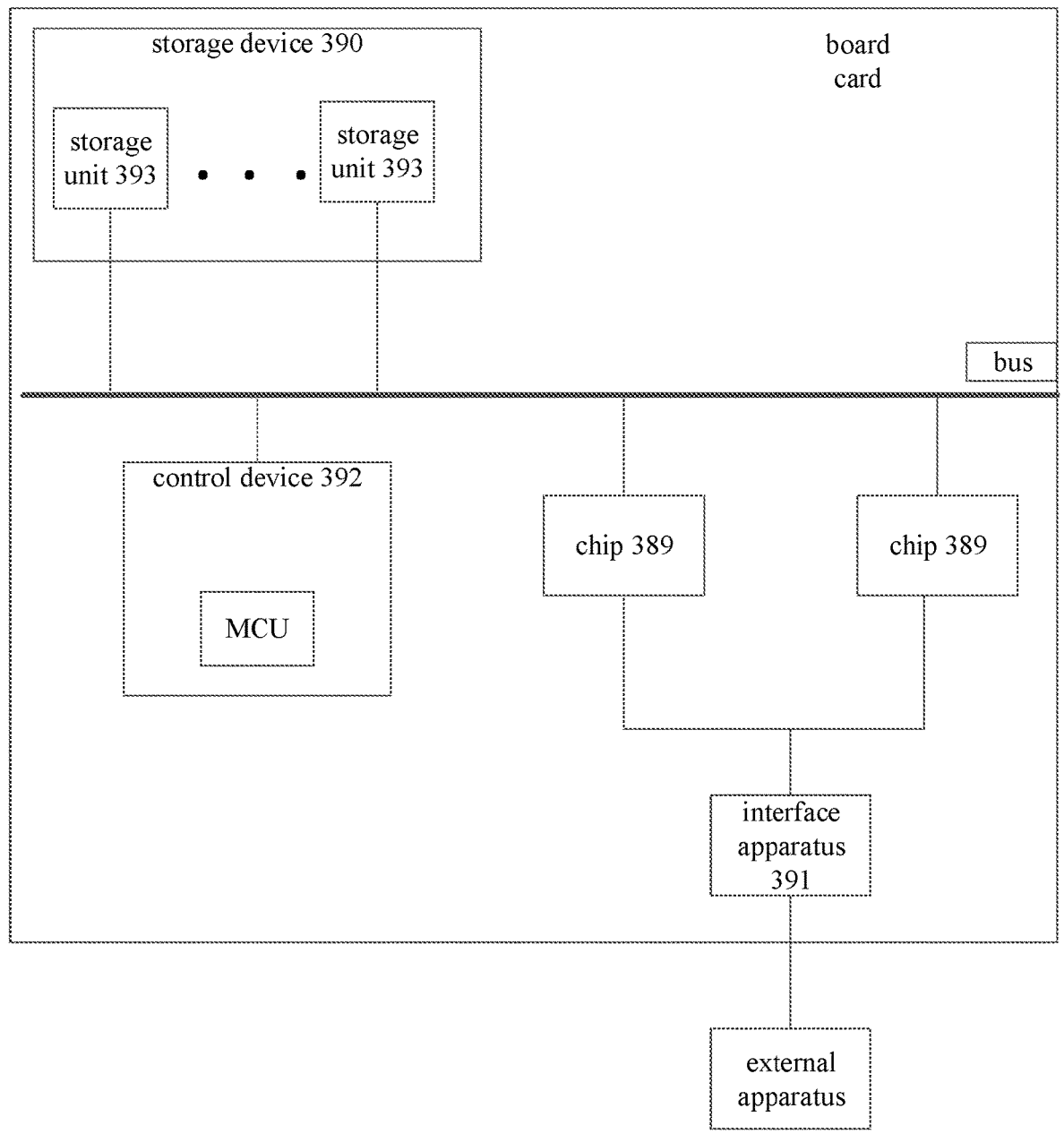
FIG. 5 is a schematic structural diagram of a board card according to an embodiment of the present disclosure.

The present disclosure further provides a board card, which may include the chip package structure. FIG. 5 is a schematic structural diagram of a board card according to an embodiment of the present disclosure. In addition to the above-mentioned chip 389, the board card may further include other supporting components, including but not limited to: a storage device 390, an interface apparatus 391, and a control device 392.

The storage device 390 is connected to the chip in the chip package structure through a bus, and is configured to store data. The storage device may include a plurality of groups of storage units 393, where each group of the storage units is connected to the chip by a bus. It can be understood that each group of the storage units may be DDR SDRAM (Double Data Rate SDRAM (synchronized dynamic random access memory)).

DDR may double a speed of SDRAM without increasing a clock rate. DDR allows reading data on rising and falling edges of the clock pulse. DDR is twice as fast as standard SDRAM. In an embodiment, the storage device may include 4 groups of the storage units, where each group of the storage units may include a plurality of DDR4 particles (chips). In an embodiment, the inner part of the chip may include four 72-bit DDR4 controllers, in which 64 bits of the four 72-bit DDR4 controllers are used for data transmission, and 8 bits of the four 72-bit DDR4 controllers are used for ECC check. It may be understood that when DDR4-3200 particles are used in each group of the storage units, the theoretical bandwidth of data transmission can reach 25600 MB/s.

In an embodiment, each group of the storage units may include a plurality of DDR SDRAMs arranged in parallel. DDR can transfer data twice in one clock cycle. A controller for controlling DDR is provided in the chip, where the controller is used for controlling the data transmission and data storage of each storage unit.

The interface apparatus is electrically connected to the chip in the chip package structure, where the interface apparatus is configured to implement data transmission between the chip and an external apparatus (such as a server or a computer). For example, in an embodiment, the interface apparatus may be a standard PCIE interface, and data to be processed is transmitted from the server to the chip through the standard PCIE interface to realize data transmission. Preferably, when a PCIE 3.0×16 interface is used for data transmission, the theoretical bandwidth can reach 16000 MB/s. In another embodiment, the interface apparatus may further include other interfaces. The present disclosure does not limit the specific types of the interfaces, as long as the interface units can implement data transmission. In addition, the computation result of the chip is still transmitted back to an external apparatus (such as a server) by the interface apparatus.

The control device is electrically connected to the chip, where the control device is configured to monitor the state of the chip. Specifically, the chip may be electrically connected to the control device through an SPI interface, where the control device may include an MCU (Micro Controller Unit). The chip may include a plurality of processing chips, a plurality of processing cores, or a plurality of processing circuits, and may drive a plurality of loads. Therefore, the chip can be in different working state such as multi-load state and light-load state. The regulation of the working states of a plurality of processing chips, a plurality of processing cores and/or a plurality of processing circuits in the chip may be implemented by the control device.

The present disclosure further provides an electronic device including the board card. The electronic device includes a data processing apparatus, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable apparatus, a transportation means, a household electrical appliance, and/or a medical apparatus. The transportation means may include an airplane, a ship, and/or a vehicle. The household electrical appliance may include a television, an air conditioner, a microwave oven, a refrigerator, an electric rice cooker, a humidifier, a washing machine, an electric lamp, a gas cooker, and a range hood. The medical apparatus may include a nuclear magnetic resonance spectrometer, a B-ultrasonic scanner, and/or an electrocardiograph.

It should be noted that, for the sake of simple description, the above method embodiments are all described as a series of action combinations. However, those skilled in the art should be aware that the present disclosure is not limited by the described action order, because according to the present disclosure, certain steps may be executed in another order or executed simultaneously. Those skilled in the art should also be aware that the embodiments described in the specification are alternative embodiments and that the actions and modules involved are not necessary in the present disclosure.

In the above-mentioned embodiments, the description of each embodiment has its own focus. For parts that are not described in detail in an embodiment, please refer to related descriptions of other embodiments.

In the embodiments of the disclosure, it should be understood that the device disclosed may be implemented in other manners. For instance, the described device embodiments are merely illustrative; for instance, division of the unit is only a logical function division and can be divided in other manners during actual implementations; for instance, a plurality of units or components may be combined or integrated into another system, or some features may be ignored, or not performed. In addition, coupling or direct coupling or communication connection between each illustrated or discussed component may be indirect coupling or communication connection through some interfaces, devices or units, and may be electrical connection or other forms of connection.

The units described as separate components may or may not be physically separated and the components illustrated as units may or may not be physical units. In other words, the units or the components may be in the same place or may be distributed to a plurality of network units. All or part of the units may be selected according to actual needs to achieve the purpose of the technical solutions of the examples.

In addition, functional units in various embodiments of the present disclosure may be integrated into one processing unit, or each unit may be physically present, or two or more units may be integrated into one unit. The above integrated unit can be implemented in the form of hardware or a software program module.

The integrated unit may be stored in a computer readable memory when it is implemented in the form of a software program module and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for enabling a computer device (which may be a personal computer, a server, or a network device and so on) to perform all or part of the steps described in the various examples of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be understood by those of ordinary skill in the art that all or a part of the various methods of the examples described above may be accomplished by means of a program to instruct associated hardware, and the program may be stored in a computer-readable memory, which may include a flash memory, a read-only memory (ROM), a random-access memory (RAM), a disk, or a compact disc (CD), and the like.

The embodiments of the present disclosure are described in detail above and specific examples are used herein to describe the principle and implementation manners of the present disclosure. The description of the above embodiments is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. An artificial intelligence computing device, comprising a controller unit and an execution unit, wherein
   the controller unit is configured to obtain a first instruction set to be executed, and obtain a second instruction set;
   the controller unit is further configured to determine that a loop body is formed between the first instruction set and the second instruction set, wherein instructions in the first instruction set and instructions in the second instruction set are of same instruction types, to be executed in a same order, but of different remaining execution times; and
   the execution unit is configured to execute the instructions in the second instruction set according to instruction information of the first instruction set when the loop body is formed between the first instruction set and the second instruction set.

2. The artificial intelligence computing device of claim 1, wherein for executing instructions in the second instruction set according to instruction information of the first instruction set, the execution unit is specifically configured to:
   jump to an operation code storage area of a first instruction in the first instruction set corresponding to a second instruction in the second instruction set according to a jump instruction, obtain an operation code of the first instruction from the operation code storage area, and take the operation code as an operation code of the second instruction, wherein the operation code includes an identification of the first instruction.

3. The artificial intelligence computing device of claim 1, wherein the first instruction set includes a first loading instruction, a first computing instruction, and a first storage instruction of a first operation task; the second instruction set includes a second loading instruction, a second computing instruction, and a second storage instruction of a second operation task; for determining whether a loop body is formed between the first instruction set and the second instruction set, the controller unit is specifically configured to:
   obtain preset instruction information corresponding to each instruction in the first instruction set and the second instruction set to obtain a plurality of pieces of preset instruction information, wherein the preset instruction information includes at least one of: instruction type, remaining execution times, and whether parity is reversed,
   compare first preset instruction information corresponding to the first loading instruction with second preset instruction information corresponding to the second loading instruction, compare third preset instruction information corresponding to the first computing instruction with fourth preset instruction information corresponding to the second computing instruction, and compare fifth preset instruction information corresponding to the first storage instruction with sixth preset instruction information corresponding to the second storage instruction, and if there is a difference in operation times between the first preset instruction information and the second preset instruction information, there is a difference in operation times between the third preset instruction information and the fourth preset instruction information, and there is a difference in operation times between the fifth preset instruction information and the sixth preset instruction information, determine that the first instruction set and the second instruction set form a loop body.

4. The artificial intelligence computing device of claim 1, wherein the first instruction set includes the first storage instruction of the first operation task, the second computing instruction of the second operation task, and a third loading instruction corresponding to a third operation task, the second instruction set includes the second storage instruction of the second operation task, a third computing instruction of the third operation task, and a fourth loading instruction of a fourth operation task, for determining whether a loop body is formed between the first instruction set and the second instruction set, the controller unit is specifically configured to:

obtain preset instruction information corresponding to each instruction in the first instruction set and the second instruction set to obtain a plurality of pieces of preset instruction information, wherein the preset instruction information includes at least one of: instruction type, remaining execution times, and whether the parity is reversed, compare fifth preset instruction information corresponding to the first storage instruction with sixth preset instruction information corresponding to the second storage instruction, compare seventh preset instruction information corresponding to the second computing instruction with eighth preset instruction information corresponding to the third computing instruction, compare ninth preset instruction information corresponding to the third loading instruction with tenth preset instruction information corresponding to the fourth loading instruction, and if there is a difference in operation times between the fifth preset instruction information and the sixth preset instruction information, there is a difference in operation times between the seventh preset instruction information and the eighth preset instruction information, and there is a difference in operation times between the ninth preset instruction information and the tenth preset instruction information, determine that the first instruction set and the second instruction set form a loop body.

5. The artificial intelligence computing device of claim 4, wherein the controller unit is further configured to:

determine whether there is correlation between the first storage instruction, the second computing instruction, and the third loading instruction, the execution unit is further configured to, when there is no correlation between the first storage instruction, the second computing instruction, and the third loading instruction, execute the first storage instruction, the second computing instruction, and the third loading instruction in parallel in a first time slice.

6. The artificial intelligence computing device of claim 5, wherein for determining whether there is correlation between the first storage instruction, the second computing instruction, and the third loading instruction, the controller unit is configured to:

fetch a first storage address interval of required data in the first storage instruction, fetch a second storage address interval of required data in the second computing instruction, and fetch a third storage address interval of required data in the third loading instruction, and if the first storage address interval, the second storage address interval, and the third storage address interval do not have overlapping areas between each other, determine that there is no correlation between the first storage instruction, the second computing instruction, and the third loading instruction.

7. The artificial intelligence computing device of claim 5, wherein for determining whether there is correlation between the first storage instruction, the second computing instruction, and the third loading instruction, the controller unit is configured to:

fetch a first writing area corresponding to the first storage instruction, fetch a second reading area and a second writing area corresponding to the second computing instruction, and fetch a third reading area corresponding to the third loading instruction, and if the first writing area, the second reading area, the second writing area, and the third reading area do not have overlapping areas between each other, determine that there is no correlation between the first storage instruction, the second computing instruction, and the third loading instruction.

8. The artificial intelligence computing device of claim 5, wherein the artificial intelligence computing device also includes a storage unit connected to an external storage device, the execution unit includes a loading execution unit, a computation execution unit, and a storage execution unit, wherein for executing the first storage instruction, the second computing instruction, and the third loading instruction in parallel in the first time slice, the storage execution unit is configured to transfer a first computation result corresponding to first input data in the first operation task from the storage unit to the external storage device according to the first storage instruction, the computation execution unit is configured to compute second input data in the second operation task according to the second computing instruction to obtain a second computation result, and the loading execution unit is configured to transfer third input data in the third operation task from the external storage device to the storage unit according to the third loading instruction.

9. The artificial intelligence computing device of claim 8, wherein the storage unit includes a first storage area and a second storage area, for transferring the third input data in the third operation task from the external storage device to the storage unit according to the third loading instruction, the loading execution unit is configured to:

perform a ping-pong operation on the third input data in the third operation task in the first time slice according to the third loading instruction, and transfer the third input data from the external storage device to the first storage area.

10. The artificial intelligence computing device of claim 9, wherein the third input data includes a plurality of pieces of third input sub-data, for performing the ping-pong operation on the third input data in the third operation task and transferring the third input data from the external storage device to the first storage area, the loading execution unit is configured to:

predict a target storage duration of each piece of the third input sub-data in the first storage area to obtain a plurality of target storage durations, and transfer the plurality of pieces of third input sub-data corresponding to the plurality of target storage durations to the first storage area in order of storage duration from longest to shortest, and store the plurality of third input sub-data from both ends of the first storage area to the middle.

11. An artificial intelligence computing method applied to an artificial intelligence computing device, comprising:
obtaining a first instruction set to be executed, and obtaining a second instruction set;
determining that a loop body is formed between the first instruction set and the second instruction set, wherein instructions in the first instruction set and instructions in the second instruction set are of same instruction types, to be executed in a same order, but of different remaining execution times; and
executing the instructions in the second instruction set according to instruction information of the first instruction set when the loop body is formed between the first instruction set and the second instruction set.

12. The artificial intelligence computing method of claim 11, wherein the executing instructions in the second instruction set according to instruction information of the first instruction set includes:
jumping to an operation code storage area of instructions corresponding to the first instruction set according to a jump instruction, obtaining an operation code of the first instruction from the operation code storage area, taking the operation code as an operation code of the second loading instruction, and obtaining an operation field corresponding to the second loading instruction, wherein the operation code includes an identification of the first computing instruction, and the operation field includes a storage address of fourth input data.

13. The artificial intelligence computing method of claim 11, wherein the first instruction set includes a first loading instruction, a first computing instruction, and a first storage instruction of a first operation task, the second instruction set includes a second loading instruction, a second computing instruction, and a second storage instruction of a second operation task, and the determining whether a loop body is formed between the first instruction set and the second instruction set includes:
obtaining preset instruction information corresponding to each instruction in the first instruction set and the second instruction set to obtain a plurality of pieces of preset instruction information, wherein the preset instruction information includes at least one of: instruction type, remaining execution times, and whether parity is reversed,
comparing first preset instruction information corresponding to the first loading instruction with second preset instruction information corresponding to the second loading instruction, comparing third preset instruction information corresponding to the first computing instruction with fourth preset instruction information corresponding to the second computing instruction, and comparing fifth preset instruction information corresponding to the first storage instruction with sixth preset instruction information corresponding to the second storage instruction, and
if there is a difference in operation times between the first preset instruction information and the second preset instruction information, there is a difference in operation times between the third preset instruction information and the fourth preset instruction information, and there is a difference in operation times between the fifth preset instruction information and the sixth preset instruction information, determining that the first instruction set and the second instruction set form a loop body.

14. The artificial intelligence computing method of claim 11, wherein the first instruction set includes the first storage instruction of the first operation task, the second computing instruction of the second operation task, and a third loading instruction corresponding to a third operation task, the second instruction set includes the second storage instruction of the second operation task, a third computing instruction of the third operation task, and a fourth loading instruction of a fourth operation task, and the determining whether a loop body is formed between the first instruction set and the second instruction set includes:
obtaining the preset instruction information corresponding to each instruction in the first instruction set and the second instruction set to obtain a plurality of pieces of preset instruction information, wherein the preset instruction information includes at least one of: instruction type, remaining execution times, and whether the parity is reversed,
comparing fifth preset instruction information corresponding to the first storage instruction with sixth preset instruction information corresponding to the second storage instruction, comparing seventh preset instruction information corresponding to the second computing instruction with eighth preset instruction information corresponding to the third computing instruction, comparing ninth preset instruction information corresponding to the third loading instruction with tenth preset instruction information corresponding to the fourth loading instruction, and
if there is a difference in operation times between the fifth preset instruction information and the sixth preset instruction information, there is a difference in operation times between the seventh preset instruction information and the eighth preset instruction information, and there is a difference in operation times between the ninth preset instruction information and the tenth preset instruction information, determining that the first instruction set and the second instruction set form a loop body.

15. The artificial intelligence computing method of claim 14, further comprising:
determining whether there is correlation between the first storage instruction, the second computing instruction, and the third loading instruction,
the execution unit is further configured to, when there is no correlation between the first storage instruction, the second computing instruction, and the third loading instruction, execute the first storage instruction, the second computing instruction, and the third loading instruction in parallel in a first time slice.

16. The artificial intelligence computing method of claim 15, wherein the determining whether there is correlation between the first storage instruction, the second computing instruction, and the third loading instruction includes:
fetching a first storage address interval of required data in the first storage instruction, fetching a second storage address interval of required data in the second computing instruction, and fetching a third storage address interval of required data in the third loading instruction, and
if the first storage address interval, the second storage address interval, and the third storage address interval do not have overlapping areas between each other, determining that there is no correlation between the first storage instruction, the second computing instruction, and the third loading instruction.

17. The artificial intelligence computing method of claim 15, wherein the determining whether there is correlation between the first storage instruction, the second computing instruction, and the third loading instruction includes:
   fetching a first writing area corresponding to the first storage instruction, fetching a second reading area and a second writing area corresponding to the second computing instruction, and fetching a third reading area corresponding to the third loading instruction, and
   if the first writing area, the second reading area, the second writing area, and the third reading area do not have overlapping areas between each other, determining that there is no correlation between the first storage instruction, the second computing instruction, and the third loading instruction.

18. The artificial intelligence computing method of claim 15, wherein the artificial intelligence computing device also includes a storage unit connected to an external storage device, and the executing the first storage instruction, the second computing instruction, and the third loading instruction in parallel in the first time slice includes:
   transferring a first computation result corresponding to first input data in the first operation task from the storage unit to the external storage device according to the first storage instruction,
   computing second input data in the second operation task according to the second computing instruction to obtain a second computation result, and
   transferring third input data in the third operation task from the external storage device to the storage unit according to the third loading instruction.

19. The artificial intelligence computing method of claim 18, wherein the storage unit includes a first storage area and a second storage area, and the transferring the third input data in the third operation task from the external storage device to the storage unit according to the third loading instruction includes:
   performing a ping-pong operation on the third input data in the third operation task in the first time slice according to the third loading instruction, and transferring the third input data from the external storage device to the first storage area.

20. The artificial intelligence computing method of claim 19, wherein the third input data includes a plurality of pieces of third input sub-data, and the performing the ping-pong operation on the third input data in the third operation task and transferring the third input data from the external storage device to the first storage area includes:
   predicting a target storage duration of each piece of third input sub-data in the first storage area among the plurality of pieces of third input sub-data to obtain a plurality of target storage durations, and
   transferring the plurality of pieces of third input sub-data corresponding to the plurality of target storage durations to the first storage area in order of storage duration from longest to shortest, and storing the plurality of third input sub-data from both ends of the first storage area to the middle.

* * * * *